(12) United States Patent
Kim et al.

(10) Patent No.: US 9,873,128 B2
(45) Date of Patent: Jan. 23, 2018

(54) ELECTROSTATIC PRECIPITATION TYPE AIR CLEANER

(71) Applicant: LG Electronics Inc.

(72) Inventors: Taeyoung Kim, Seoul (KR); Sangyoon Kim, Seoul (KR); Okchun Hyun, Seoul (KR); Yanghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 15/052,465

(22) Filed: Feb. 24, 2016

(65) Prior Publication Data

US 2016/0243559 A1 Aug. 25, 2016

(30) Foreign Application Priority Data

Feb. 25, 2015 (KR) .................. 10-2015-0026693

(51) Int. Cl.
| | |
|---|---|
| *B03C 3/47* | (2006.01) |
| *B01D 53/32* | (2006.01) |
| *B03C 3/08* | (2006.01) |
| *B03C 3/12* | (2006.01) |
| *B03C 3/41* | (2006.01) |

(Continued)

(52) U.S. Cl.
CPC .............. *B03C 3/47* (2013.01); *B01D 53/323* (2013.01); *B03C 3/08* (2013.01); *B03C 3/12* (2013.01); *B03C 3/41* (2013.01); *B03C 3/60* (2013.01); *F24F 3/166* (2013.01)

(58) Field of Classification Search
CPC combination set(s) only.
See application file for complete search history.

(56) References Cited

U.S. PATENT DOCUMENTS 5,707,428 A * 1/1998 Feldman .................. B03C 3/06
96/54
6,251,171 B1 * 6/2001 Marra ....................... B03C 3/12
96/69

(Continued)

FOREIGN PATENT DOCUMENTS

| KR | 10-0859840 B1 | 9/2008 |
|---|---|---|
| KR | 100859840 B1 * | 9/2008 |

(Continued)

*Primary Examiner* — Duane Smith
*Assistant Examiner* — Sonji Turner
(74) *Attorney, Agent, or Firm* — Dentons US LLP (57) ABSTRACT

An electrostatic precipitation type air cleaner is disclosed herein. The air cleaner includes a charging module to charge dust particles by applied power and a collection module to collect the dust particles charged by the charging module. The collection module includes high voltage electrode plates and low voltage electrode plates disposed opposite the high voltage electrode plates so as to form air passages with the high voltage electrode plates, at least one of the high voltage electrode plates and the low voltage electrode plates includes a conductive member, a dielectric member to surround at least a part of the conductive member and coating layers configured to coat the surfaces of the dielectric member, and the coating layer includes 0.5 w % to 5 w % of zinc oxide. The coating layer including 0.5 w % to 5 w % of zinc oxide may have high antimicrobial activity and maintain high surface hardness.

16 Claims, 7 Drawing Sheets

(51) Int. Cl.
 *B03C 3/60* (2006.01)
 *F24F 3/16* (2006.01)

(56) References Cited

U.S. PATENT DOCUMENTS

| | | | |
|---|---|---|---|
| 6,506,238 B1* | 1/2003 | Endo | B03C 3/12 |
| | | | 96/79 |
| 6,805,732 B1 | 10/2004 | Billiotte et al. | |
| 2003/0005824 A1* | 1/2003 | Katou | B03C 3/12 |
| | | | 96/35 |
| 2005/0051028 A1* | 3/2005 | Botvinnik | B03C 3/08 |
| | | | 96/88 |
| 2007/0261555 A1 | 11/2007 | Aubert | |
| 2008/0307973 A1* | 12/2008 | Gale | B03C 3/08 |
| | | | 96/77 |
| 2008/0314250 A1* | 12/2008 | Cowie | B03C 3/08 |
| | | | 96/86 |
| 2009/0010801 A1* | 1/2009 | Murphy | B01D 46/0028 |
| | | | 422/4 |
| 2011/0094383 A1* | 4/2011 | Noh | B03C 3/12 |
| | | | 96/17 |
| 2012/0312170 A1 | 12/2012 | Noh et al. | |
| 2015/0377500 A1* | 12/2015 | Lee | B03C 3/02 |
| | | | 96/77 |

FOREIGN PATENT DOCUMENTS

| | | |
|---|---|---|
| KR | 10-2009-0039721 A | 4/2009 |
| KR | 10-2011-0088744 A | 8/2011 |
| WO | 2007/077897 A1 | 7/2007 |

* cited by examiner

ELECTROSTATIC PRECIPITATION TYPE AIR CLEANER

CROSS-REFERENCE TO RELATED APPLICATION

This application claims the benefit of Korean Patent Application No. 10-2015-0026693, filed on Feb. 25, 2015 in the Korean Intellectual Property Office, the disclosure of which is incorporated herein by reference.

BACKGROUND OF THE INVENTION

1. Field of the Invention

The present disclosure relates to an electrostatic precipitation type air cleaner and, more particularly, to an electrostatic precipitation type air cleaner in which a collection module collects dust particles charged by a charging module.

2. Description of the Related Art

In general, an electrostatic precipitation type air cleaner is an apparatus that is mounted in an air purifier or an air conditioner, such as a cooler or a heater, charges foreign substances, such as dust, contained in air and then collects the charged foreign substances.

For example, as disclosed in Korean Patent Publication No. 10-0710693B1, an electrostatic precipitation type air cleaner may include a charging module to charge dust particles in air and a collection module to collect the dust particles charged by the charging module. The collection module may include a high voltage electrode (or an applying electrode) and a low voltage electrode (or a ground electrodes). Dust particles in air may be charged by the charging module and then attached to the surface of the collection module so as to be collected. The dust particles attached to the collection module may include organic matter, bacteria, mold, etc.

However, a bad odor may be caused if, among the dust particles attached to the collection module, there is decomposed organic matter. Additionally, there may be secondary contamination if bacteria multiply in the dust particles attached to the collection module.

SUMMARY OF THE INVENTION

An object of the present disclosure is to provide an electrostatic precipitation type air cleaner which may inhibit propagation of microorganisms attached to a collection module.

A further object of the present disclosure is to provide an electrostatic precipitation type air cleaner which may perform an effective antibacterial function with respect to microorganisms attached to a collection unit.

Another object of the present disclosure is to provide an electrostatic precipitation type air cleaner which may destroy bacteria through an antibacterial function.

The objects of the present disclosure are not limited to the above-mentioned objects and other objects that have not been mentioned above will become evident to those skilled in the art from the following description.

To achieve the above objects, there is provided an electrostatic precipitation type air cleaner including a charging module to charge particles by an applied power, and a collection module to collect the charged particles, the collection module including at least one high voltage electrode plate and at least one low voltage electrode plate, the high and low voltage electrode plates being spaced apart from each other to form an air passage, wherein at least one of the high and low voltage electrode plates includes a conductive member, a dielectric member to surround at least a portion of the conductive member, and at least one coating layer to coat a surface of the dielectric member, wherein the coating layer includes 0.5 w % to 5 w % of zinc oxide.

The coating layer may include 20 w % to 30 w % of urethane acrylate.

The coating layer may include 1 w % to 3 w % of a photoinitiator.

The coating layer may include 45 w % to 50 w % of isopropyl alcohol.

The coating layer may include at least one of butyl acrylate, pentaerythritol triacrylate, and polyethylene glycol diacrylate.

The thickness of the coating layer may be 5 μm to 10 μm.

The zinc oxide may be a powder having a particle size of 5 μm to 1000 μm.

The dielectric member may include polymer plastic having a thickness of 50 μm to 500 μm.

The coating layer further may include 20 w % to 30 w % of urethane acrylate, 1 w % to 3 w % of a photoinitiator, and 45 w % to 50 w % of isopropyl alcohol.

The coating layer further may include 28 w % of urethane acrylate, 2 w % of 1-hydroxy cyclohexyl phenyl ketone, 47 w % of isopropyl alcohol, 8 w % of butyl acrylate, 4 w % of pentaerythritol triacrylate, and 8 w % of polyethylene glycol diacrylate.

The conductive member may be a screen-print on the dielectric member.

The dielectric member includes a first dielectric film and a second dielectric film, the conductive member is disposed between the first and second dielectric films, and the coating layer is disposed on the outer surfaces of the first and second dielectric films.

An adhesive member may be provided between the first dielectric film and the conductive member, wherein the adhesive member includes a stack part provided on the conductive member and at least one protrusion part that protrudes outside of the edges of the conductive member, and wherein the first dielectric film is adhered to a first surface of the protrusion part and the second dielectric film is adhered to a second surface of the protrusion part.

An adhesive member provided between the second dielectric film and the conductive member, wherein the adhesive member includes a stack part provided on the conductive member and at least one protrusion part that protrudes outside of the edges of the conductive member, and wherein the first dielectric film is adhered to a first surface of the protrusion part and the second dielectric film is adhered to a second surface of the protrusion part.

The coating layer may include 3 w % of zinc oxide, 28 w % of urethane acrylate, 2 w % of 1-hydroxy cyclohexyl phenyl ketone, 47 w % of isopropyl alcohol, 8 w % of butyl acrylate, 4 w % of pentaerythritol triacrylate, and 8 w % of polyethylene glycol diacrylate.

The coating layer may include 3 w % of zinc oxide, 28 w % of urethane acrylate, 2 w % of 1-hydroxy cyclohexyl phenyl ketone, 47 w % of isopropyl alcohol, 8 w % of butyl acrylate, 4 w % of pentaerythritol triacrylate, and 8 w % of polyethylene glycol diacrylate.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Advantages, features, and methods for achieving those of embodiments may become apparent upon referring to embodiments described later in detail together with the attached drawings. However, embodiments are not limited to the embodiments disclosed hereinafter, but may be embodied in different modes. The same reference numbers may refer to the same elements throughout the specification.

Figure 1:
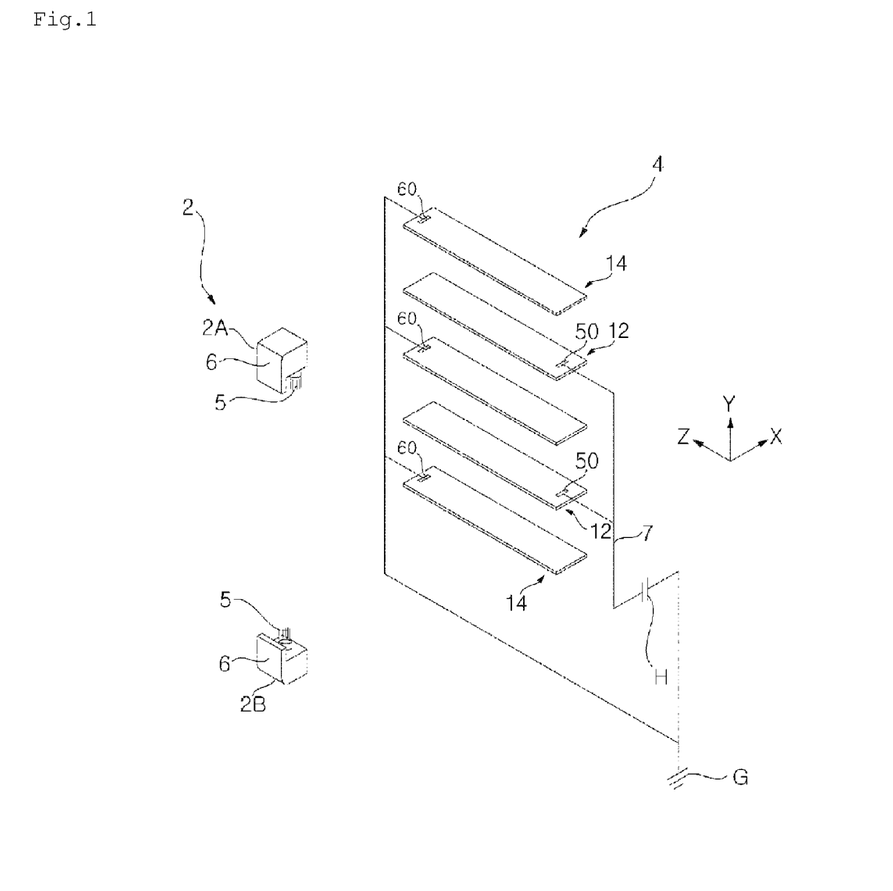
FIG. 1 is a perspective view illustrating elements of an electrostatic precipitation type air cleaner in accordance with an embodiment of the present disclosure.
Figure 2:
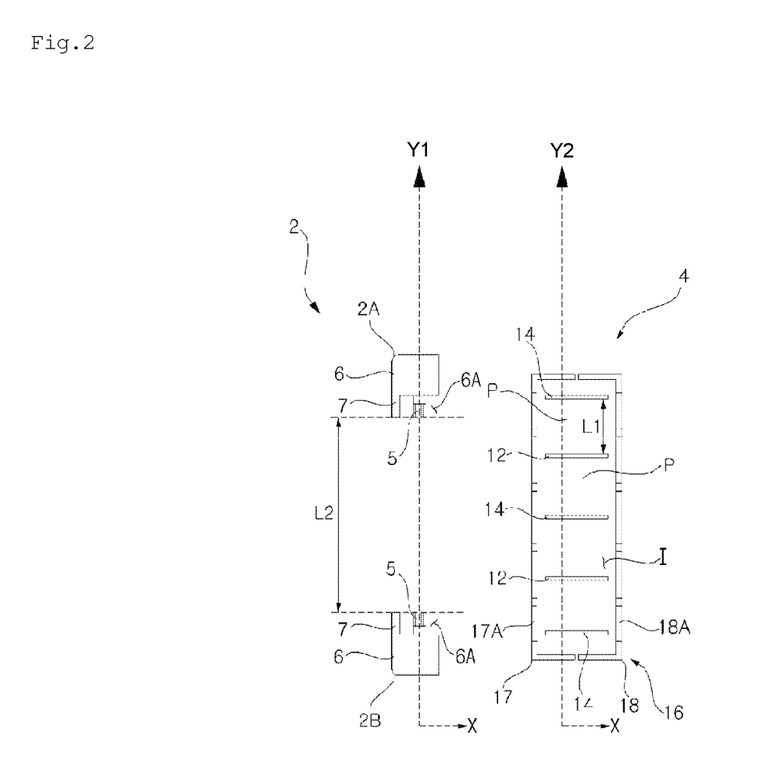
FIG. 2 is a side view illustrating elements of the electrostatic precipitation type air cleaner in accordance with an embodiment of the present disclosure.
Figure 3:
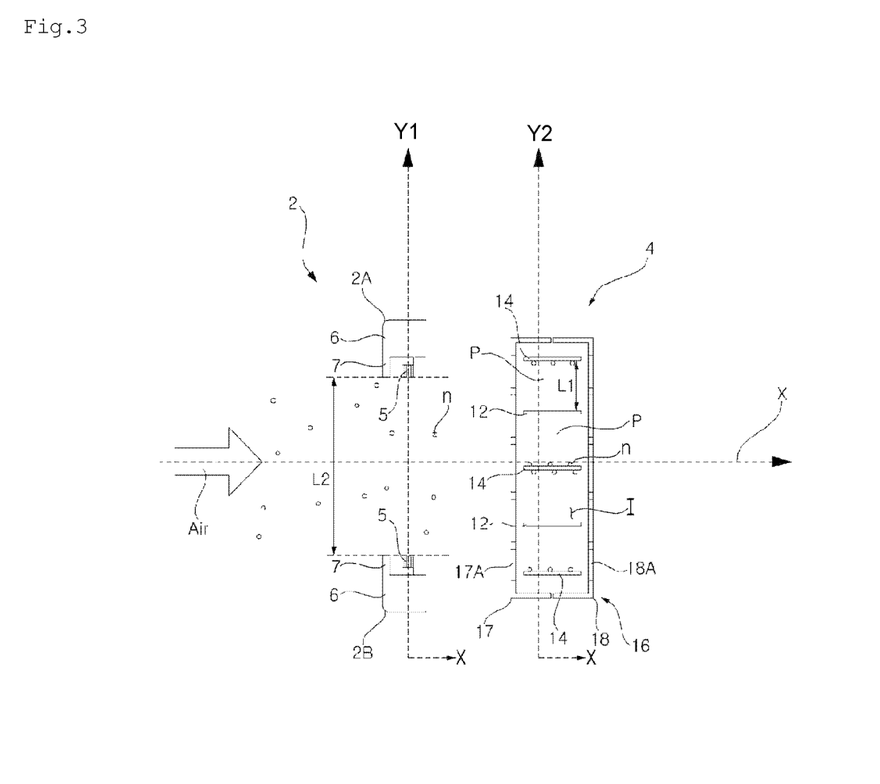
FIG. 3 is a view illustrating an operation of the electrostatic precipitation type air cleaner of FIG. 2.

FIG. 1 is a perspective view illustrating elements of an electrostatic precipitation type air cleaner in accordance with an embodiment of the present disclosure. FIG. 2 is a side view illustrating the elements of the electrostatic precipitation type air cleaner in accordance with an embodiment of the present disclosure. FIG. 3 is a view illustrating an operation of the electrostatic precipitation type air cleaner of FIG. 2.

Referring to FIG. 1, the electrostatic precipitation type air cleaner includes a charging module 2 to charge (e.g., repel) dust particles n by applied power, and a collection module 4 to collect the dust particles n charged by the charging module 2.

An air flow direction X is a flow direction from the charging module 2 to the collection module 4. The charging module 2 may include at least one ion generator 2A or 2B to generate ions. The charging module 2 may be located in front of the collection module 4, but is not limited thereto. Ions generated from the charging module 2 together with air flow may move to the collection module 4.

As shown, two ion generators 2A and 2B are provided in the charging module 2. The ion generators 2A and 2B may be spaced from each other in a vertical direction and, thus, a separation direction is the vertical direction Y. The air flow direction X and the separation direction Y of the ion generators 2A and 2B may be perpendicular to each other.

The ion generator 2A may be provided at an upper region of the charging module 2 and the ion generator 2B may be provided at a lower region. In such arrangement, ion generator 2A may be referred to as an upper ion generator and ion generator 2B may be referred to as a lower ion generator.

The ion generators 2A and 2B may each include an electrode housing 6, a carbon fiber electrode 5 provided inside the electrode housing 6, and a PCB provided inside the electrode housing 6 and connected to the carbon fiber electrode 5.

The ion generators 2A and 2B may be provided in front of the collection module 4 in the air flow direction X. The ion generators 2A and 2B may discharge ions using diffusion charging and the discharged ions may charge the dust particles n. The ions generated by the ion generators 2A and 2B together with air may move in the air flow direction X.

The ion generators 2A and 2B may have a smaller size than the overall size of the collection module 4. A separation distance L2 between the upper ion generator 2A and the lower ion generator 2B may be shorter than the height of the collection module 4 (the length of the collection module 4 in the direction Y).

Each of the ion generators 2A and 2B may include the carbon fiber electrode 5 to perform corona discharge. The carbon fiber electrode 5 may maximize the amount of generated ions. The carbon fiber electrode 5 may be formed in a brush-like shape.

The carbon fiber electrodes 5 may be provided in front of the collection module 4. The carbon fiber electrodes 5 may be provided in the separation direction Y. The carbon fiber electrode 5 of the upper ion generator 2A may be arranged so as to face in a downward direction, and the carbon fiber electrode 5 of the lower ion generator 2B may be arranged so as to face in an upward direction.

The carbon fiber electrodes 5 of the upper ion generator 2A and the lower ion generator 2B may be arranged opposite each other. For example, the carbon fiber electrodes 5 may be arranged so as to intersect the air flow direction X.

When high voltage is applied to the carbon fiber electrodes 5, discharge may be carried out and molecules in air may be ionized. The carbon fiber electrodes 5 may generate anions, such as $OH^-$, $O^-$, etc., or cations, such as $H^+$, etc.

In the carbon fiber electrodes 5, a plurality of fine carbon fibers are provided in a brush-like shape.

The ions generated by the carbon fiber electrodes 5 charge dust particles n in air. The anions may provide electrons to dust particles n and charge the dust particles n into a cathode. The cations may remove electrons from dust particles n and charge the dust particles n into an anode.

Dust particles n contained in air may be charged by the ion generators 2A and 2B and then move to the collection module 4.

The ion generators 2A and 2B may ionize molecules in air by high voltage generated by a high voltage generator H and thus generate ions.

Discharge is carried out in the carbon fiber electrodes 5 of the ion generators 2A and 2B and, thus, molecules in air may be ionized and generated ions may charge dust particles n in air.

The carbon fiber electrode 5 may be installed in the electrode housing 6. The PCB (not shown) may be installed in the electrode housing 6, and the PCB and the carbon fiber electrode 5 may be connected. The carbon fiber electrode 5 may be connected to the PCB through a separate wire or be directly connected to the PCB.

The electrode housing 6 may surround the carbon fiber electrode 5.

An electrode cover 7 to cover the front portion of the carbon fiber electrode 5 may be formed on the electrode housing 6. The electrode cover 7 may surround the carbon fiber electrode 5. The electrode cover 7 protrudes toward the counterpart ion generator.

The electrode housing may also include an electrode installation space 6A, in which the carbon fiber electrode 5 is provided. Accordingly, the electrode installation space 6A may be formed by the electrode cover 7.

A region in front of the electrode installation space 6A may be covered by the electrode cover 7 and a region at the rear of the electrode installation space 6A, where the collection module 4 is provided, may be opened.

The carbon fiber electrode 5 does not protrude from the electrode housing 6 to the outside. The length of the electrode cover 7 may be greater than or equal to the length of the carbon fiber electrode 5. The tip of the carbon fiber electrode 5 may be located at a height which is less than or equal to the height of the tip of the electrode cover 7. Accordingly, the tip of the electrode cover 7 and the tip of the carbon fiber electrode 5 may be positioned collinearly. The electrode cover 7 may be provided in front of the carbon fiber electrode 5.

When air flows in the air flow direction X, the electrode cover 7 may prevent the air flow from directly contacting the carbon fiber electrode 5.

The ion generators 2A and 2B may be provided in an air conditioner. The ion generators 2A and 2B may be provided at an inlet through which air is drawn into the air conditioner. The electrode housings 6 may be provided in an inlet body (not shown) forming the inlet of the air conditioner.

A pair of ion generators 2A and 2B may be arranged in parallel with the collection module 4. For example, the ion generators 2A and 2B may be arranged in a first separation direction Y1 and the collection module 4 is disposed in a second separation direction Y2.

The collection module 4 may include a dust collection case 16 provided with an inlet 17A and an outlet 18A and having an inner space I formed therein, high voltage electrode plates 12 provided in the inner space I, and low voltage electrode plates 14 provided in the inner space I opposite the high voltage electrode plates 12 to form passages P.

The dust collection case 16 may include an inlet case 17 provided with the inlet 17A and an outlet case 18 provided with the outlet 18A. The inner space I is formed between the inlet case 17 and the outlet case 18.

The high voltage electrode plates 12 and the low voltage electrode plates 14 may be arranged in the second separation direction Y2. The high voltage electrode plates 12 and the low voltage electrode plates 14 may be arranged in the vertical direction. The high voltage electrode plates 12 and the low voltage electrode plates 14 may be alternately arranged.

The high voltage electrode plates 12 and the low voltage electrode plates 14 form a separation distance L1. The separation distance L1 between the high voltage electrode plate 12 and the low voltage electrode plate 14 is less than the separation distance L2 between a pair of ion generators 2A and 2B.

The charging module 2 may include a wire discharge electrode (not shown) to which high voltage is applied, and a ground electrode plate (not shown) spaced from the wire discharge electrode and grounded. In this case, the wire discharge electrode may be connected to the high voltage generator H and the ground electrode plate may be connected to the ground. When dust particles n contained in air pass through a space between the wire discharge electrode and the ground electrode plate, the dust particles may be charged by corona discharge between the wire discharge electrode and the ground electrode plate and then move to the collection module 4.

The disposition direction of the high voltage electrode plates 12 and the low voltage electrode plates 14 may be perpendicular to the air flow direction X.

The high voltage electrode plates 12 and the low voltage electrode plates 14 may be alternately arranged. For example, one high voltage electrode plate 12 may be provided between a pair of low voltage electrode plates 14, and one low voltage electrode plate 14 may be provided between a pair of high voltage electrode plates 12.

The high voltage electrode plates 12 may be provided between the inlet case 17 and the outlet case 18. The low voltage electrode plates 14 may be provided between the inlet case 17 and the outlet case 18. The high voltage electrode plates 12 and the low voltage electrode plates 14 may be arranged in the length direction between the inlet case 17 and the outlet case 18.

It is understood that the high and low voltage electrode plates 12 and 14 may be formed in a variety of shapes. As shown, the high and low voltage electrode plates 12 and 14 each have a rectangular-like shape.

The short direction of the high voltage electrode plates 12 is the air flow direction X. The long direction Z of the high voltage electrode plates 12 is a direction perpendicular to the separation direction Y and the air flow direction X.

With reference to FIG. 1, if the high voltage electrode plates 12 and the low voltage electrode plates 14 are arranged in the vertical direction, the short direction is the forward and backward direction and the long direction Z is the leftward and frontward direction.

If the high voltage electrode plates 12 are arranged to a long length in the leftward and frontward direction, the low voltage electrode plates 14 may be arranged to the long length in the lateral direction in parallel with the high voltage electrode plates 12.

A high voltage connection part 50 may be provided on the high voltage electrode plate 12. The high voltage connection part 50 may be connected to the high voltage generator H. The high voltage connection part 50 may be an applying terminal to apply high voltage to the high voltage electrode plate 12.

The high voltage connection part 50 may have a plate-like shape. Alternatively, the high voltage connection part 50 may have a wire-like shape. It is understood that the high voltage connection part 50 is not limited to any particular shape.

A grounding connection part 60 may be provided on the low voltage electrode plate 14. The grounding connection part 60 is grounded (G). The grounding connection part 60 may be a grounding terminal to connect the low voltage electrode plate 14 to the ground G.

The grounding connection part 60 may have a plate-like shape. Alternatively, the grounding connection part 60 may have a wire-like shape. It is understood that the grounding connection part 60 is not limited to any particular shape.

Charged dust particles n may be guided by an electric field formed between the high voltage electrode plate 12 and the low voltage electrode plate 14. The charged dust particles n may be guided to the low voltage electrode plate 14 in the electric field and attached to the low voltage electrode plate 14.

Figure 4:
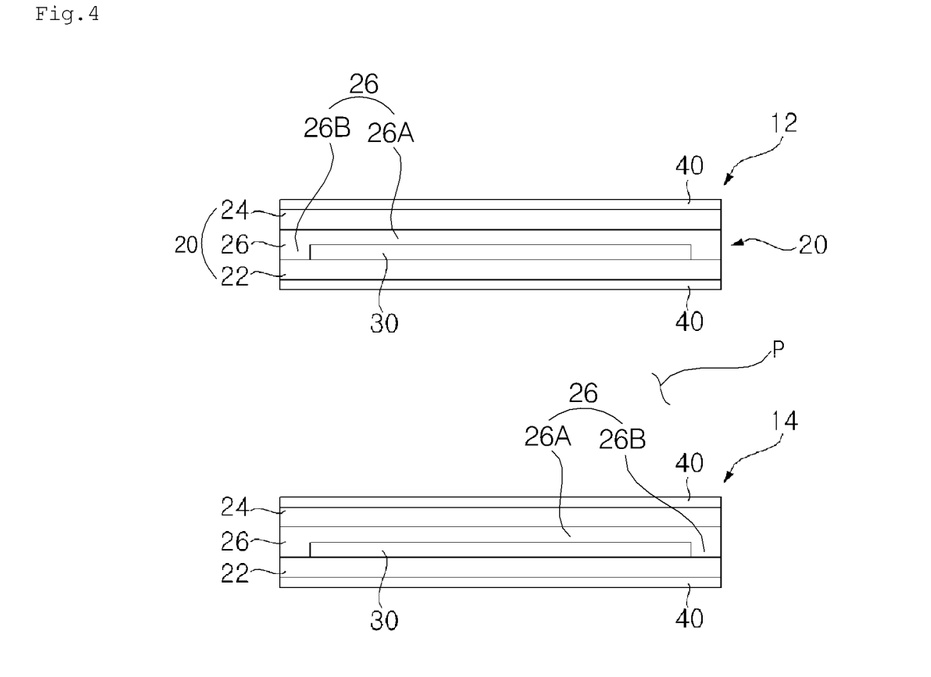
FIG. 4 is a cross-sectional view illustrating the high voltage electrode plate and the low voltage electrode plate shown in FIG. 2.

FIG. 4 is an enlarged cross-sectional view illustrating the high voltage electrode plate and the low voltage electrode plate of FIG. 2.

As shown, at least one of the high voltage electrode plates 12 and the low voltage electrode plates 14 may include a dielectric member 20, a conductive member 30, and coating layers 40. The dielectric member 20 may surround the conductive member 30. The conductive member 30 may be provided within the dielectric member 20. The surfaces of the dielectric member 20 may be coated with the coating layers 40.

The high voltage electrode plates 12 and the low voltage electrode plates 14 may be manufactured to have the same structure. Accordingly, each of the high and low voltage electrode plates 12 and 14 may include the dielectric member 20, the conductive member 30 and the coating layers 40.

Alternatively, the high voltage electrode plates 12 may be formed of a metal material, and the low voltage electrode plates 14 may include the dielectric member 20, the conductive member 30 and the coating layers 40. In this case, dust particles n are attached to the coating layers 40 of the low voltage electrode plates 14.

Since some of charged dust particles n may be attached to the surfaces of the high voltage electrode plates 12, each of the high voltage electrode plates 12 and the low voltage electrode plates 14 may include the dielectric member 20, the conductive member 30 and the coating layers 40.

The dielectric member 20 includes a first dielectric film 22 and a second dielectric film 24 surrounding the conductive member 30. The dielectric member 20 may surround at least a part of the conductive member 30.

The conductive member 30 may be provided between the first dielectric film 22 and the second dielectric film 24. At least one of the first dielectric film 22 and the second dielectric film 24 may be bonded to the conductive member 30. In this embodiment, the first dielectric film 22 is bonded to the conductive member 30.

The dielectric films 22 and 24 may be formed of polypropylene (PP), polyethylene terephthalate (PET), polyethylene naphthalate (PEN), polyurethane (PU), polychlorinated biphenyl (PCB), polyurethane foam (PUF), polyvinylidene fluoride (PVDF) or polyether ether ketone (PEEK).

The dielectric films 22 and 24 may include a nano-filler, such as $TiO_2$, $Al_2O_3$, or $SiO_2$. The dielectric films 22 and 24 may be formed of polymer plastic to have a thickness of 50 μm to 500 μm.

An adhesive member 26 may be provided between the first dielectric film 22 and the conductive member 30 or between the second dielectric film 24 and the conductive member 30.

The first dielectric film 22 and the second dielectric film 24 may be adhered to the conductive member 30 by the adhesive member 26. The adhesive member 26 may surround at least a part of the conductive member 30. The adhesive member 26 may be adhered to the upper or lower surface of the conductive member 30.

The adhesive member 26 may include a stack part 26A stacked on the conductive member 30 and protrusion parts 26B protruding to the outside of the edges of the conductive member 30.

Any one of the first dielectric film 22 and the second dielectric film 24 may be adhered to the stack part 26A, and the first dielectric film 22 and the second dielectric film 24 may be adhered to the protrusion parts 26B. The first dielectric film 22 may be adhered to one surface (e.g., a first surface) of each of the protrusion parts 26B and the second dielectric film 24 may be adhered to the other surface (e.g., a second surface) of each of the protrusion parts 26B.

In this embodiment, the adhesive member 26 is formed as one film and has a greater surface area than the surface area of the conductive member 30. Therefore, the protrusion part 26B may be formed at at least one of the edges of the conductive member 30. In this embodiment, the protrusion parts 26B are formed at or near all four edges of the conductive member 30.

In this embodiment, the first dielectric film 22 is adhered to the lower surfaces of the protrusion parts 26B and the second dielectric film 24 is adhered to the upper surfaces of the protrusion parts 26B.

Alternatively, the adhesive member 26 may be provided on the upper or lower surface of the conductive member 30, as opposed to both surfaces of the conductive member 30. Using one adhesive member 26, the first dielectric film 22 and the second dielectric film 24 may be adhered to the conductive member 30.

Thereby, use of the adhesive member 26 may be minimized and thus a manufacturing process may be simplified. Further, by minimizing use of the adhesive member 26, the thickness of the electrode plate may be minimized.

The conductive member 30 may be a carbon electrode formed of carbon. The conductive member 30 may be a carbon pattern formed within the dielectric member 20. The carbon pattern may form a carbon electrode.

The conductive member 30 may have a thickness of 1 μm to 100 μm. The conductive member 30 may be formed on any one of the first dielectric film 22 and the second dielectric film 24. The conductive member 30 may be manufactured by performing screen-printing on any one of the first dielectric film 22 and the second dielectric film 24.

The conductive member 300 may also include a portion that is not surrounded by the dielectric member 20. In other words, the dielectric member 20 surrounds the conductive member 30 but may leave a portion of the conductive member 30 exposed. The exposed portion of the conductive member 30 may be connected to the high voltage connection part 50 or the grounding connection part 60 shown in FIG. 1.

The high voltage connection part 50 may be formed at a portion of the conductive member 30 of the high voltage electrode plate 12, which is exposed to the outside. High voltage is applied to the high voltage connection part 50.

The grounding connection part 60 is formed at a portion of the conductive member 30 of the low voltage electrode plate 14, which is exposed to the outside.

The high voltage connection parts 50 and the grounding connection parts 60 may be provided at opposite sides in the air flow direction X. With reference to FIG. 1, if the high voltage connection parts 50 are provided at the right side, the grounding connection parts 60 may be provided at the left side. Alternatively, if the high voltage connection parts 50 are provided at the left side, the grounding connection parts 60 may be provided at the right side.

In this embodiment, the coating layers 40 may be formed on the surfaces of the high voltage electrode plates 12 or on the surfaces of the low voltage electrode plates 14. Dust particles n charged by the charging module 2 may be attached to the coating surfaces 40.

The coating layers 40 may include an ingredient that inhibits propagation of bacteria. In this embodiment, the coating layers 40 may include 0.5 w % to 5 w % of zinc oxide (ZnO).

In general, an ingredient mainly used as an antimicrobial substance may be Ag, Cu or an organic antimicrobial agent. These ingredients may be expensive or unsafe for humans. Accordingly, in this embodiment, the coating layer 40 may include zinc oxide (ZnO), which is less expensive and safer for humans than Ag and Cu.

The thickness of the coating layer 40 may be 5 μm to 10 μm. If the thickness of the coating layer 40 is less than 5 μm, the antimicrobial activity is less reliable due to the small thickness of the coating layer 40. Therefore, the coating layer 40 preferably has a thickness of at least 5 µm.

Zinc oxide (ZnO) may be a powder having a particle size of 5 µm to 1000 µm. Through a homogenization process, zinc oxide (ZnO) powder having a particle size of 1000 µm or less is preferably used.

The coating layer 40 may further include urethane acrylate. The urethane acrylate may serve as a binder. Urethane acrylate is a material having high friction resistance, stiffness and flexibility, and may be coated on a dielectric film and then UV cured or thermally cured. The content of urethane acrylate in the coating layer 40 may be 20 w % to 30 w %.

The coating layer 40 may further include a photoinitiator. 1-hydroxy cyclohexyl phenyl ketone may be used as the photoinitiator. The content of the photoinitiator may be 1 w % to 3 w %.

The coating layer 40 may further include isopropyl alcohol. Isopropyl alcohol may serve as a diluent. The content of isopropyl alcohol may be 45 w % to 50 w %.

The coating layer 40 may further include at least one of butyl acrylate, pentaerythritol triacrylate, and polyethylene glycol diacrylate.

For example, the coating layer 40 may include 3 w % of zinc oxide (ZnO), 28 w % of urethane acrylate, 2 w % of 1-hydroxy cyclohexyl phenyl ketone, 47 w % of isopropyl alcohol, 8 w % of butyl acrylate, 4 w % of pentaerythritol triacrylate, and 8 w % of polyethylene glycol diacrylate.

Figure 5:
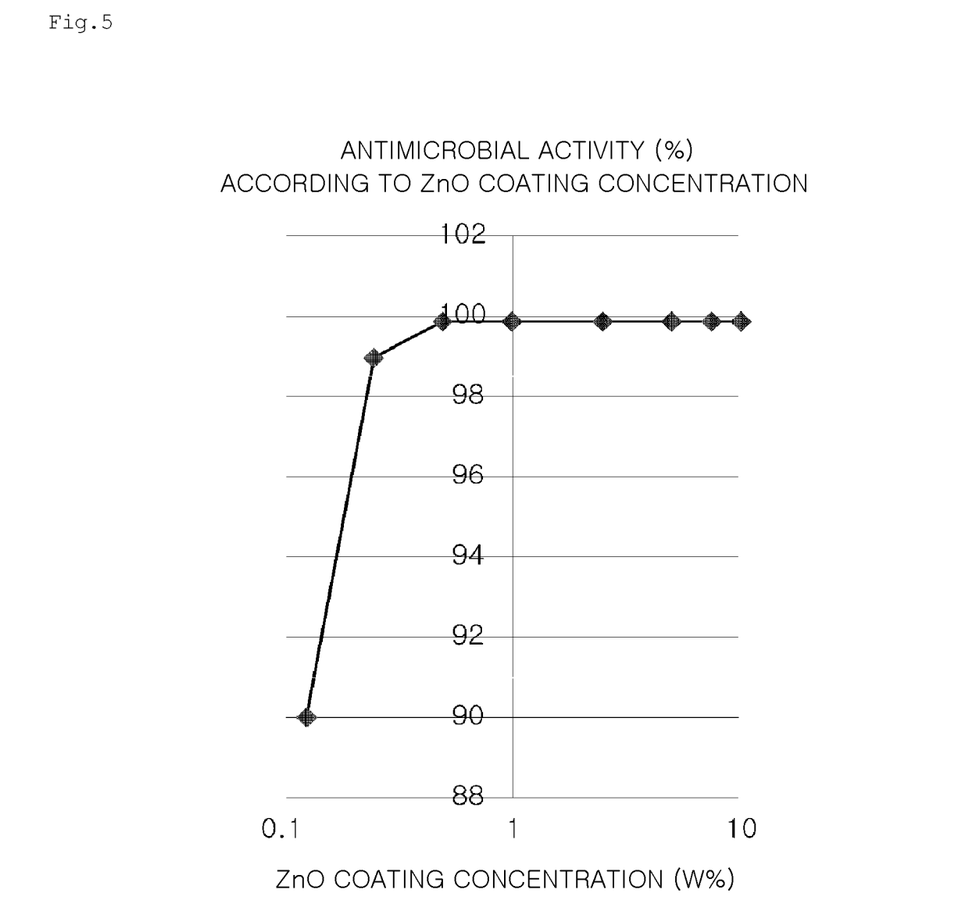
FIG. 5 is a graph illustrating antimicrobial activity according to a concentration of ZnO.
Figure 6:
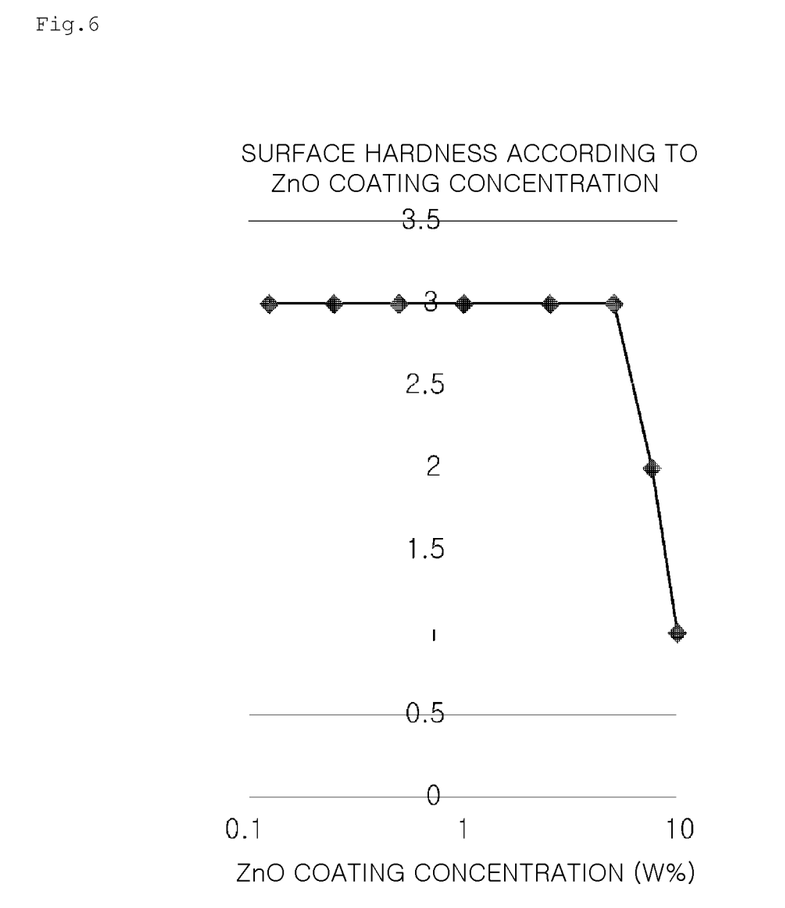
FIG. 6 is a graph illustrating surface hardness according to a concentration of ZnO.

FIG. 5 is a graph illustrating antimicrobial activity according to a concentration of ZnO. FIG. 6 is a graph illustrating surface hardness according to concentration of ZnO.

The antimicrobial activity shown in FIG. 5 represents results obtained by varying only the content (w %) of zinc oxide (ZnO) and the content (w %) of urethane acrylate. The antimicrobial activity (%) shown in FIG. 5 are test results obtained by decreasing the content (w %) of urethane acrylate in proportion to increase in the content (w %) of zinc oxide (ZnO).

The surface hardness shown in FIG. 6 represents results obtained by varying only the content (w %) of zinc oxide (ZnO) and the content (w %) of urethane acrylate. The surface hardness shown in FIG. 6 are test results obtained by decreasing the content (w %) of urethane acrylate in proportion to increase in the content (w %) of zinc oxide (ZnO).

Antimicrobial activity (%) is an ability to inhibit propagation and growth of colon *bacillus, staphylococcus* and mold.

The surface hardness denotes a scratch resistance of the coating layer 40. The surface hardness of the coating layer 40 may be obtained by measuring surface hardness of an area of the coating layer 40 having a size of 100 mm*100 mm with an H501 pencil hardness tester (three times/three times at a load of 750 g).

The surface hardness shown in FIG. 6 represents relative surface hardness of the coating layer 40. FIG. 6 illustrates relative values with respect to the highest surface hardness.

Table 1 identifies both antimicrobial activity and surface hardness according to concentration of ZnO.

TABLE 1

| Coating concentration (%) | Antimicrobial activity (%) | Surface hardness (H) |
| --- | --- | --- |
| 0.125 | 90 | 3 |
| 0.25 | 99 | 3 |
| 0.5 | 99.9 | 3 |
| 1 | 99.9 | 3 |

TABLE 1-continued

| Coating concentration (%) | Antimicrobial activity (%) | Surface hardness (H) |
| --- | --- | --- |
| 2.5 | 99.9 | 3 |
| 5 | 99.9 | 3 |
| 7.5 | 99.9 | 2 |
| 10 | 99.9 | 1 |

According to test results, it is understood that the electrostatic precipitation type air cleaner has different antimicrobial activities according to the contents (w %) of ZnO.

For example, with reference to FIG. 5 and Table 1, when the coating layer 40 includes 0.5 w % or more of ZnO, the coating layer 40 has antimicrobial activity of 99.9%.

According to the test results, it may be understood that the electrostatic precipitation type air cleaner has different surface hardnesses according to the contents (w %) of ZnO.

For example, with reference to FIG. 6 and Table 1, a surface hardness of the coating layer 40 is high, i.e., 3, when the content of ZnO is less than or equal to 0.5 w %, but the surface hardness of the coating layer 40 decreases to 2 when the content of ZnO is 7.5 w %, and further decreased to 1 when the content of ZnO is 10 w %.

Therefore, the coating layer 40 in accordance with this embodiment may provide high antimicrobial activity and high surface hardness when the content of zinc oxide (ZnO) is 0.5 w % to 5 w %.

Figure 7:
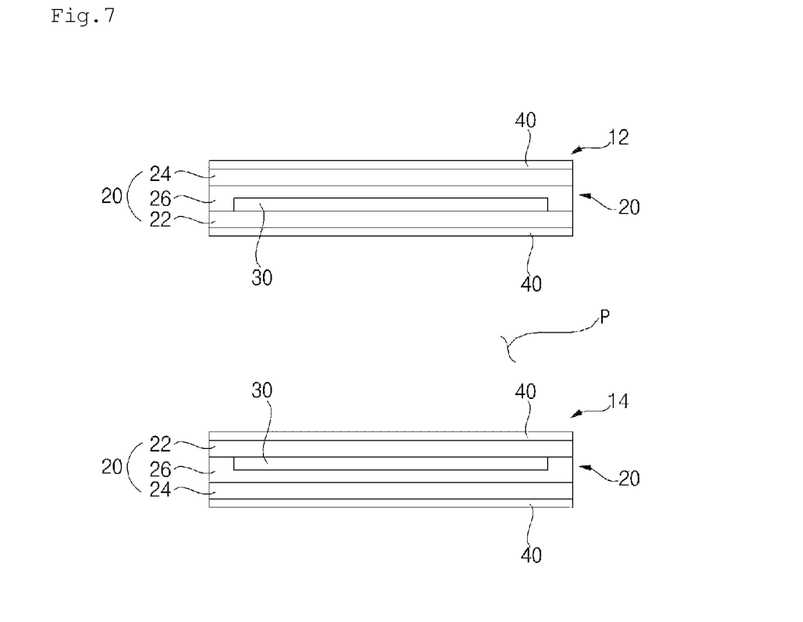
FIG. 7 is a cross-sectional view illustrating a high voltage electrode plate and a low voltage electrode plate in accordance with another embodiment of the present disclosure.

FIG. 7 is a cross-sectional view illustrating a high voltage electrode plate and a low voltage electrode plate in accordance with another embodiment of the present disclosure.

As shown, a high voltage electrode plate 12 and a low voltage electrode plate 14 may be arranged such that a first dielectric film 22 of the high voltage electrode plate 12 and a first dielectric film 22 of the low voltage electrode plate 14 face each other.

Similar to the embodiment shown in FIGS. 1 to 6, a conductive member 30 is printed on the first dielectric film 22. However, in this embodiment, the respective films 22 are arranged so as to face a passage P. The remaining elements of this embodiment are substantially the same as those of the embodiment shown in FIGS. 1 to 6 and a detailed description thereof will thus be omitted.

Figure 8:
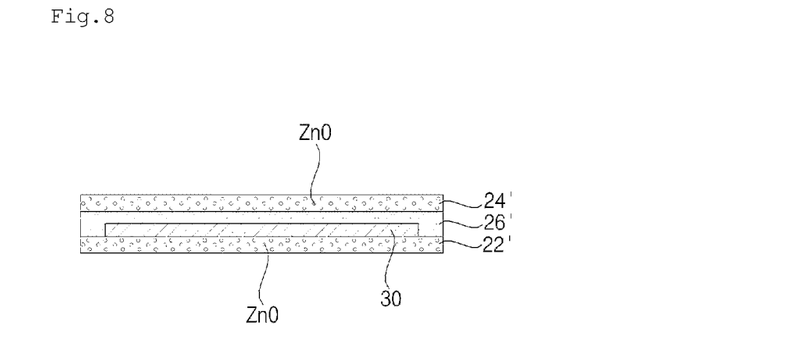
FIG. 8 is a cross-sectional view of a dielectric member in accordance with yet another embodiment of the present disclosure.

FIG. 8 is a cross-sectional view of a dielectric member in accordance with yet another embodiment of the present disclosure.

Unlike the embodiment shown in FIGS. 1 to 6, no coating layers 40 are formed. Zinc oxide (ZnO) having antimicrobial activity may be mixed with at least one of a first dielectric film 22' and a second dielectric film 24'.

The zinc oxide (ZnO) may be a powder having a particle size of 5 µm to 1000 µm. Through a homogenization process, zinc oxide (ZnO) powder having a particle size that is not greater than 1000 µm may be used.

Further, although not shown, coating layers 40 may be formed on the surfaces of the first dielectric film 22' and a second dielectric film 24' including zinc oxide (ZnO). The remaining elements of this embodiment are substantially the same as those of the embodiment shown in FIGS. 1 to 6 and a detailed description thereof will thus be omitted.

As apparent from the above description, an electrostatic precipitation type air cleaner in accordance with the present disclosure exhibits at least one of the following effects.

First, a coating layer formed on the surface of a dielectric member includes 0.5 w % to 5 w % of zinc oxide, which may improve antimicrobial activity.

Second, because the coating layer including zinc oxide is formed on at least one of high voltage electrode plates and low voltage electrode plates, the electrostatic precipitation type air cleaner in accordance with the present disclosure is less expensive compared with electrode plates that are coated with an antimicrobial material, such as silver or copper.

Third, the coating layer includes 0.5 w % to 5 w % of zinc oxide, which may increase antimicrobial activity and maintain high surface hardness.

Fourth, the present disclosure provides a composition ratio among zinc oxide, urethane acrylate, 1-hydroxy cyclohexyl phenyl ketone, isopropyl alcohol, butyl acrylate, pentaerythritol triacrylate, and polyethylene glycol diacrylate, forming the coating layer.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An electrostatic precipitation type air cleaner comprising:
   a charging module to charge particles by an applied power; and
   a collection module to collect the charged particles, the collection module including at least one high voltage electrode plate and at least one low voltage electrode plate, the high and low voltage electrode plates being spaced apart from each other to form an air passage,
   wherein at least one of the high and low voltage electrode plates comprises:
   a conductive member,
   a dielectric member to surround at least a portion of the conductive member, and
   at least one coating layer to coat a surface of the dielectric member,
   whereby the coating layer includes 0.5 w % to 5 w % of zinc oxide.

2. The electrostatic precipitation type air cleaner of claim 1, wherein the coating layer further includes 20 w % to 30 w % of urethane acrylate.

3. The electrostatic precipitation type air cleaner of claim 1, wherein the coating layer further includes 1 w % to 3 w % of a photoinitiator.

4. The electrostatic precipitation type air cleaner of claim 1, wherein the coating layer further includes 45 w % to 50 w % of isopropyl alcohol.

5. The electrostatic precipitation type air cleaner of claim 1, wherein the coating layer further includes at least one of butyl acrylate, pentaerythritol triacrylate, and polyethylene glycol diacrylate.

6. The electrostatic precipitation type air cleaner of claim 1, wherein the thickness of the coating layer is 5 μm to 10 μm.

7. The electrostatic precipitation type air cleaner of claim 1, wherein zinc oxide is a powder having a particle size of 5 μm to 1000 μm.

8. The electrostatic precipitation type air cleaner of claim 1, wherein the dielectric member includes polymer plastic having a thickness of 50 μm to 500 μm.

9. The electrostatic precipitation type air cleaner of claim 1, wherein the coating layer further includes 20 w % to 30 w % of urethane acrylate, 1 w % to 3 w % of a photoinitiator, and 45 w % to 50 w % of isopropyl alcohol.

10. The electrostatic precipitation type air cleaner of claim 1, wherein the coating layer further includes 28 w % of urethane acrylate, 2 w % of 1-hydroxy cyclohexyl phenyl ketone, 47 w % of isopropyl alcohol, 8 w % of butyl acrylate, 4 w % of pentaerythritol triacrylate, and 8 w % of polyethylene glycol diacrylate.

11. The electrostatic precipitation type air cleaner of claim 1, wherein the conductive member is a screen-print on the dielectric member.

12. The electrostatic precipitation type air cleaner of claim 1, wherein:
   the dielectric member includes a first dielectric film and a second dielectric film,
   the conductive member is disposed between the first and second dielectric films, and
   the coating layer is disposed on the outer surfaces of the first and second dielectric films.

13. The electrostatic precipitation type air cleaner of claim 12, further comprising an adhesive member provided between the first dielectric film and the conductive member,
   wherein the adhesive member includes a stack part provided on the conductive member and at least one protrusion part that protrudes outside of the edges of the conductive member, and
   wherein the first dielectric film is adhered to a first surface of the protrusion part and the second dielectric film is adhered to a second surface of the protrusion part.

14. The electrostatic precipitation type air cleaner of claim 12, further comprising an adhesive member provided between the second dielectric film and the conductive member,
   wherein the adhesive member includes a stack part provided on the conductive member and at least one protrusion part that protrudes outside of the edges of the conductive member, and
   wherein the first dielectric film is adhered to a first surface of the protrusion part and the second dielectric film is adhered to a second surface of the protrusion part.

15. The electrostatic precipitation type air cleaner of claim 13, wherein:
   the coating layer further includes 3 w % of zinc oxide, 28 w % of urethane acrylate, 2 w % of 1-hydroxy cyclohexyl phenyl ketone, 47 w % of isopropyl alcohol, 8 w % of butyl acrylate, 4 w % of pentaerythritol triacrylate, and 8 w % of polyethylene glycol diacrylate.

16. The electrostatic precipitation type air cleaner of claim 14, wherein:
   the coating layer further includes 3 w % of zinc oxide, 28 w % of urethane acrylate, 2 w % of 1-hydroxy cyclohexyl phenyl ketone, 47 w % of isopropyl alcohol, 8 w % of butyl acrylate, 4 w % of pentaerythritol triacrylate, and 8 w % of polyethylene glycol diacrylate.

* * * * *